US009641353B2

(12) United States Patent
Wang (10) Patent No.: US 9,641,353 B2
(45) Date of Patent: May 2, 2017

(54) FORWARDING PACKETS (71) Applicant: Hangzhou H3C Technologies Co., Ltd., Hangzhou (CN)

(72) Inventor: Feng Wang, Beijing (CN)

(73) Assignee: HEWLETT PACKARD ENTERPRISE DEVELOPMENT LP, Houston, TX (US)

( * ) Notice: Subject to any disclaimer, the term of this patent is extended or adjusted under 35 U.S.C. 154(b) by 0 days.

(21) Appl. No.: 14/891,834

(22) PCT Filed: May 15, 2014

(86) PCT No.: PCT/CN2014/077537
§ 371 (c)(1),
(2) Date: Nov. 17, 2015

(87) PCT Pub. No.: WO2014/183650
PCT Pub. Date: Nov. 20, 2014

(65) Prior Publication Data
US 2016/0149724 A1 May 26, 2016

(30) Foreign Application Priority Data

May 17, 2013 (CN) .......................... 2013 1 0186138

(51) Int. Cl.
*H04L 12/46* (2006.01)
*H04L 12/64* (2006.01)
(Continued)

(52) U.S. Cl.
CPC .......... *H04L 12/4633* (2013.01); *H04L 12/46* (2013.01); *H04L 12/6418* (2013.01); *H04L 45/66* (2013.01); *H04L 45/745* (2013.01)

(58) Field of Classification Search
CPC . H04L 12/4633; H04L 12/6418; H04L 45/66; H04L 45/745; H04L 12/46–12/4695
See application file for complete search history.

(56) References Cited

U.S. PATENT DOCUMENTS

2009/0016365 A1 1/2009 Sajassi et al.
2010/0177752 A1* 7/2010 Aggarwal ............... H04L 45/50
370/338
(Continued)

FOREIGN PATENT DOCUMENTS

| CN | 101072238 | 11/2007 |
|---|---|---|
| CN | 102739498 | 10/2012 |

(Continued)

OTHER PUBLICATIONS

International Search Report and Written Opinion dated Aug. 13, 2014, PCT Patent Application PCT/CN2014/077537 dated May 15, 2014, ISA/CN.

*Primary Examiner* — Dung B Huynh
(74) *Attorney, Agent, or Firm* — Hewlett Packard Enterprise Patent Department (57) ABSTRACT

According to various examples, in a site network, a layer-2 gateway device via which a terminal accesses a layer-2 network establishes a virtual link and an IS-IS relation with a layer-3 edge device, sends information of an learned MAC address to the layer-3 edge device, receives a packet sent by the layer-3 edge device via the virtual link, performs tunnel decapsulation on the packet, and searches a local MAC forwarding table based on a VLAN ID and a destination MAC address in the decapsulated packet to forward the packet in the site network according to a search result.

16 Claims, 7 Drawing Sheets

(51) Int. Cl.
*H04L 12/721* (2013.01)
*H04L 12/741* (2013.01)

(56) References Cited

U.S. PATENT DOCUMENTS

| | | | | |
|---|---|---|---|---|
| 2011/0317703 | A1* | 12/2011 | Dunbar | H04L 12/462 370/392 |
| 2012/0014386 | A1* | 1/2012 | Xiong | H04L 29/12028 370/392 |
| 2013/0089093 | A1* | 4/2013 | Bacthu | H04L 12/4633 370/390 |
| 2013/0148663 | A1* | 6/2013 | Xiong | H04L 45/745 370/392 |
| 2013/0250949 | A1* | 9/2013 | Farinacci | H04L 12/1836 370/390 |
| 2013/0308646 | A1* | 11/2013 | Sajassi | H04L 45/66 370/395.53 |
| 2013/0318219 | A1* | 11/2013 | Kancherla | H04L 49/70 709/222 |
| 2014/0211800 | A1* | 7/2014 | Chunduri | H04L 45/02 370/392 |
| 2014/0307541 | A1* | 10/2014 | Badoni | H04L 45/12 370/221 |

FOREIGN PATENT DOCUMENTS

| | | |
|---|---|---|
| CN | 102801820 | 11/2012 |
| CN | 102932254 | 2/2013 |
| CN | 103078800 | 5/2013 |

\* cited by examiner

FORWARDING PACKETS

CLAIM FOR PRIORITY

The present application is a national stage filing under 35 U.S.C 371 of PCT application number PCT/CN2014/077537, having an international filing date May 15, 2014, which claims the benefit of priority from Chinese Patent Application, No. 201310186138.0, having a filing date of May 17, 2013, the disclosures of which are hereby incorporated by reference in their entireties.

BACKGROUND

Most enterprise networks and corresponding data centers are deployed as multiple physical sites distributed in different geographical locations to improve reliability and provide redundancy. The physical sites are configured to provide similar services and are able to perform layer-2 communications with each other. In order to implement dynamic resource allocation and management across the sites, a virtual machine should be able to transit freely between the data centers. The transition of the virtual machine should be transparent to users which require the virtual machine to have a constant IP address, thus layer-2 networks of the sites located at different locations should be interconnected.

Ethernet virtual interconnect (EVI) is a technique providing Ethernet interconnections across sites via virtual links. Based on conventional service provider and enterprise networks, EVI provides flexible layer-2 interconnections for distributed physical sites.

BRIEF DESCRIPTION OF THE DRAWINGS

Features of the present disclosure are illustrated by way of example and not limited in the following figures, in which like numerals indicate like elements, in which.

DETAILED DESCRIPTIONS

For simplicity and illustrative purposes, the present disclosure is described by referring mainly to an example thereof. In the following description, numerous specific details are set forth in order to provide a thorough understanding of the present disclosure. It will be readily apparent however, that the present disclosure may be practiced without limitation to these specific details. In other instances, some methods and structures have not been described in detail so as not to unnecessarily obscure the present disclosure. As used herein, the term "includes" means includes but not limited to, the term "including" means including but not limited to. The term "based on" means based at least in part on. Quantities of an element, unless specifically mentioned, may be one or a plurality of, or at least one.

Figure 1:
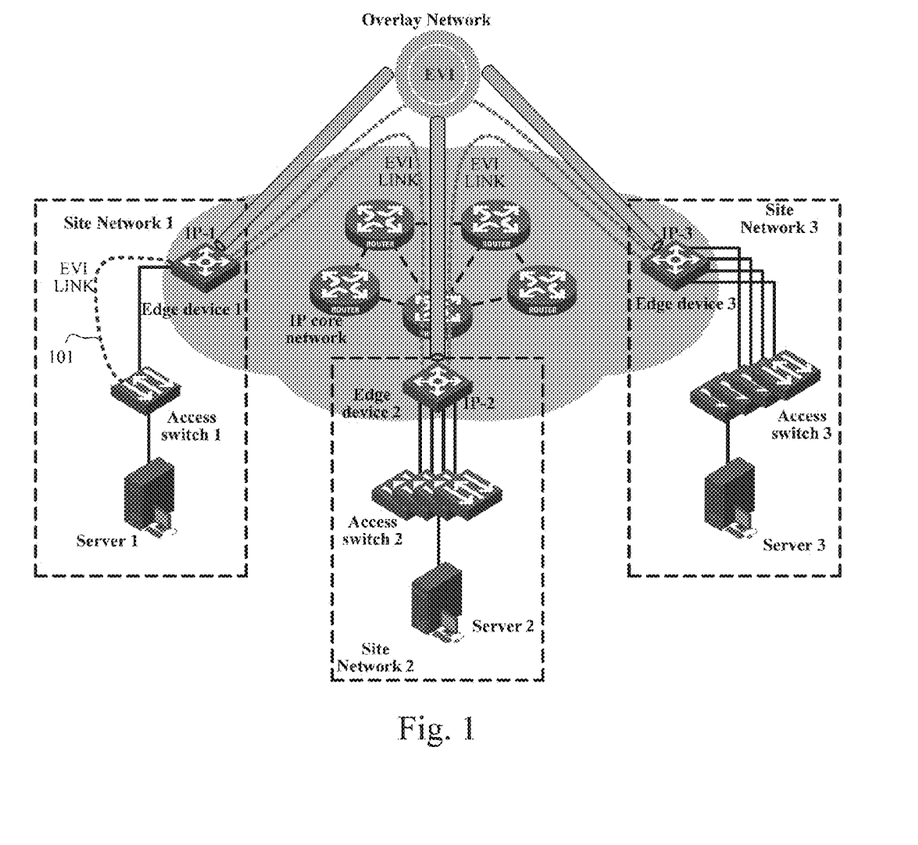
FIG. 1 is a schematic diagram illustrating an EVI network in accordance with examples of the present disclosure.

Current cross-site layer-2 virtually interconnected networks are generally EVI networks. However, other techniques for virtually interconnecting site networks may be used within the scope of this disclosure, and EVI networks are used merely as an example. FIG. 1 is a schematic illustrating an EVI network in accordance with examples of the present disclosure. As shown in FIG. 1, EVI is an advanced "MAC in IP" technique for implementing layer-2 virtual private networks (L2VPN) based on an IP core network. An EVI network may include plural site networks, e.g., site networks 1-3, an overlay network and a core network.

A site network is a layer-2 network which is connected to the core network via one or multiple edge devices and has independent service functions. A site network is usually managed and controlled by a single organization, and mainly includes hosts and switches. Edge devices provide layer-2 switching functions between sites.

The overlay network is a virtual network established between edge devices of the sites, providing layer-2 interconnections between site networks. Edge devices may inform each other of MAC addresses of all hosts and devices connected to the edge devices so as to interconnect multiple sites to form a larger layer-2 forwarding domain.

The core network is a network which provides interconnections between the site networks and mainly includes IP routing devices.

FIG. 1 shows site networks 1-3. Site network 1 includes edge device 1, access switch 1 and a server 1 which serves as a terminal device. Access switch 1 is a layer-2 gateway device providing services for server 1. Edge device 1 is a layer-3 device for connecting site network 1 to the IP core network. Similarly, site network 2 includes edge device 2, access switch 2 and server 2, and site network 3 includes edge device 3, access switch 3 and server 3. Edge devices in FIG. 1 are all equipped with EVI capabilities. Between each two edge devices, an EVI link is established in the IP core network.

In various examples, when a cross-site layer-2 virtual interconnection network is being deployed, layer-2 gateway devices within some or all of site networks that provide access for terminals may be configured to be user virtual interconnection devices (U-virtual interconnection devices), and edge devices in the overlay network may be configured to be server virtual interconnection devices (S-virtual interconnection devices). For example, EVI functions are enabled in access switch 1 in site network 1, and an EVI link 101 is established between access switch 1 and edge device 1. Site network 2 and site network 3 may adopt the structure of a conventional site network. In other examples, site network 2 and site network 3 may adopt the structure of site network 1.

Figure 2:
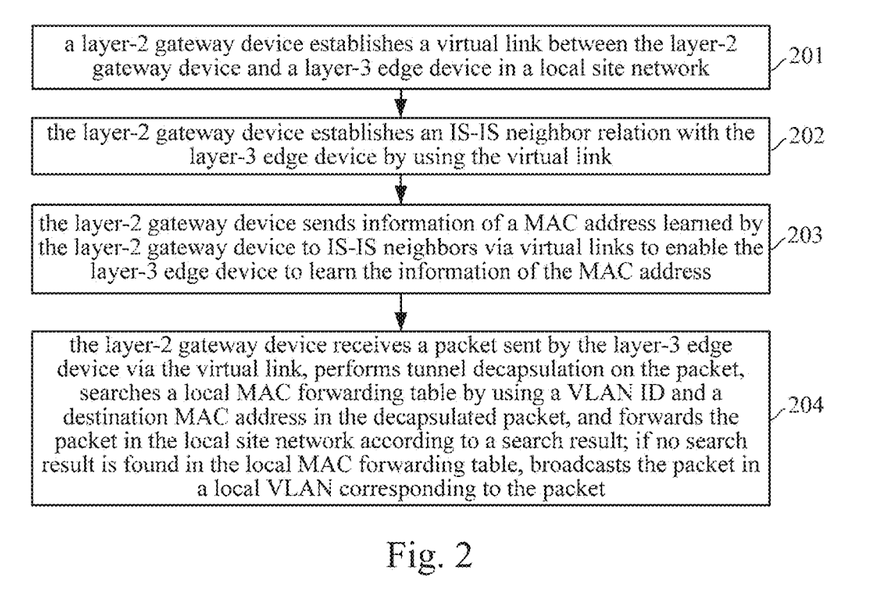
FIG. 2 is a flowchart illustrating a method of forwarding packets in accordance with examples of the present disclosure.

FIG. 2 is a flowchart illustrating a method of forwarding packets in accordance with examples of the present disclosure. The method is applicable to a layer-2 gateway device in a site network. The layer-2 gateway device may also have its EVI functions enabled. As shown in FIG. 2, the method may include the following procedures.

At block 201, the layer-2 gateway device establishes a virtual link (e.g., an EVI link) with a layer-3 edge device in a local site network, i.e., the site network where the layer-2 gateway device belongs.

At block 202, the layer-2 gateway device establishes an intermediate system-intermediate system (IS-IS) neighbor relation with the layer-3 edge device by using the virtual link.

At block 203, the layer-2 gateway device sends information of a MAC address learned by the layer-2 gateway device to an IS-IS neighbor via the virtual link, so as to enable the layer-3 edge device to learn the information of the MAC address.

At block 204, the layer-2 gateway device receives a packet from the layer-3 edge device via the EVI link, performs tunnel decapsulation on the packet, queries a local MAC forwarding table by using a virtual local area network (VLAN) ID and a destination MAC address in the decapsulated packet, and forwards the packet within the local site network. If no search result is found in the MAC forwarding table, the layer-2 gateway device may broadcast the packet in a local VLAN corresponding to the packet.

In various examples, the layer-2 gateway device may decide whether to enable functions of "not learning remote MAC addresses" based on the capacity of the MAC forwarding table in the layer-2 gateway device.

When the functions of "not learning remote MAC addresses" are enabled, the layer-2 gateway device may send a notification to the layer-3 edge device indicating functions of not learning remote MAC addresses have been enabled to instruct the layer-3 edge device not to send MAC address information to the layer-2 gateway device.

After receiving a packet sent by a local terminal device (e.g., a server or another host device), the layer-2 gateway device may search the local MAC forwarding table to forward the packet. If no search result is found, the packet is broadcast in a local VLAN corresponding to the packet if the packet is a broadcast packet, and is processed with EVI encapsulation and sent to the layer-3 edge device via the EVI link. If the packet is an unknown multicast packet, the packet is only broadcast within the local VLAN corresponding to the packet. If the packet is a unicast packet, the packet is processed with EVI encapsulation and sent only to the layer-3 edge device via the EVI link.

When functions of "learning remote MAC addresses" are enabled in the layer-2 gateway device, the layer-2 gateway device may send a notification to the layer-3 edge device indicating functions of learning remote MAC addresses have been enabled to instruct the layer-3 edge device to send MAC address information to the layer-2 gateway device. Hence, the layer-2 gateway device may learn MAC address information received from the layer-3 edge device via the EVI link.

After receiving a packet sent by a local terminal device, the layer-2 gateway device searches the local MAC forwarding table and forwards the packet according to a search result. If no search result is found, the packet is broadcast in a local VLAN corresponding to the packet if the packet is a broadcast packet, and is processed with EVI encapsulation and sent to the layer-3 edge device via the EVI link. If the packet is an unknown multicast packet or an unknown unicast packet, the packet is only broadcast within a local VLAN corresponding to the packet.

Figure 3:
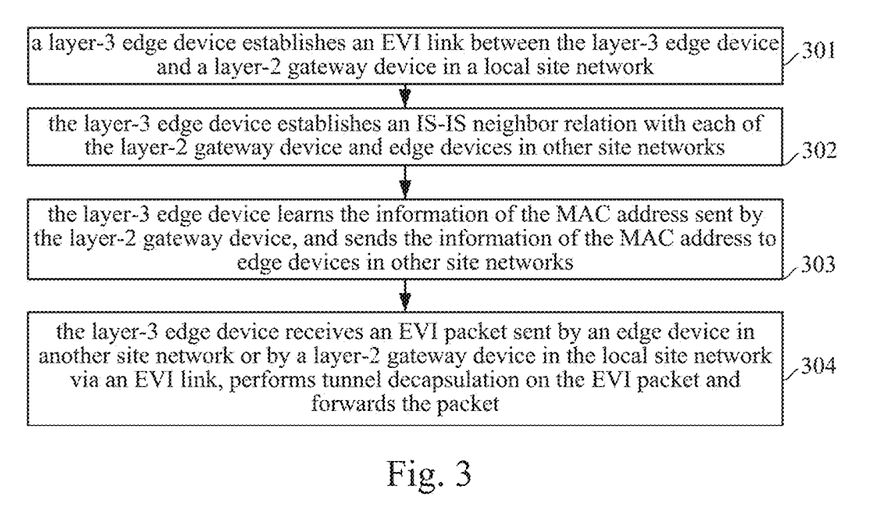
FIG. 3 is a flowchart illustrating a method of forwarding packets in accordance with examples of the present disclosure.

FIG. 3 is a flowchart illustrating a method of forwarding packets in accordance with examples of the present disclosure. The method is applicable to a layer-3 edge device in a site network. As shown in FIG. 3, the method may include the following procedures.

At block 301, a layer-3 edge device establishes an EVI link with a layer-2 gateway device located in a local site network.

At block 302, the layer-3 edge device establishes an IS-IS neighbor relation with the layer-2 gateway device and an IS-IS neighbor relation with an edge device located in another site network.

At block 303, the layer-3 edge device studies information of a MAC address sent by the layer-2 gateway device, and sends the information of the MAC address learned by the layer-3 edge device to edge devices in other site networks.

At block 304, the layer-3 edge device receives an EVI packet sent by a layer-2 gateway device in the local site network or by an edge device located in another site network, performs tunnel decapsulation on the EVI packet and forwards the decapsulated EVI packet.

If the EVI packet is sent by an edge device located in another site network via an EVI link, the EVI packet is processed with tunnel decapsulation. A local MAC forwarding table is searched by using a VLAN ID and a destination MAC address in the decapsulated packet, and then the packet is forwarded within the local site network. If no search result is found, the packet is broadcast in a local VLAN corresponding to the packet, and is sent to the layer-2 gateway device via the EVI link after being processed through EVI encapsulation.

If the EVI packet is sent by a layer-2 gateway device located in the local site network via the EVI link, the EVI packet is processed with tunnel decapsulation. A local MAC forwarding table is searched by using a VLAN ID and a destination MAC address in the decapsulated packet, and then the packet is forwarded according to a search result. If no search result is found, the packet is broadcast in a local VLAN corresponding to the packet, and is sent to edge devices located in other site networks via the EVI link after being processed through EVI encapsulation, if there are at least two layer-2 gateway devices in the local site network, the decapsulated packet may also be processed through EVI encapsulation and sent to the other layer-2 gateway devices in the local site network except for the layer-2 gateway device that sent the EVI packet.

Figure 4:
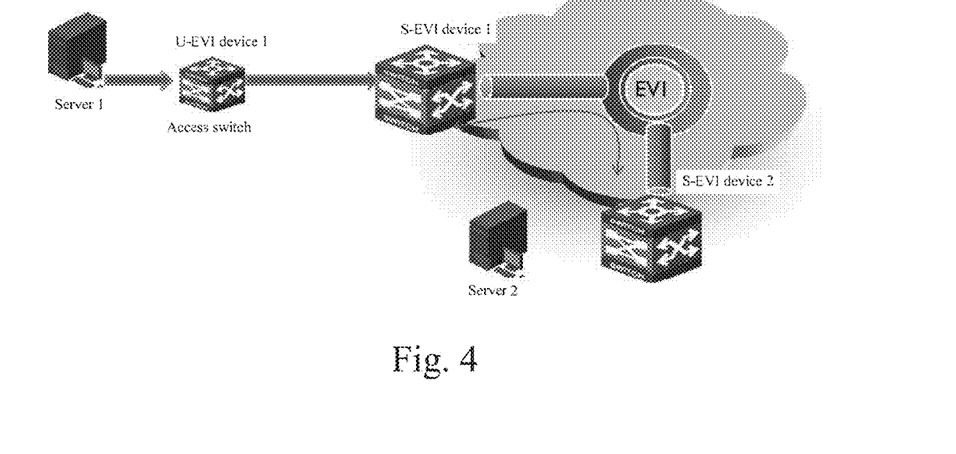
FIG. 4 is a schematic diagram illustrating a mechanism of cross-site interconnections in an EVI network in accordance with examples of the present disclosure.

FIG. 4 is a schematic diagram illustrating a mechanism of cross-site interconnections in an EVI network in accordance with examples of the present disclosure. As shown in FIG. 4, when an EVI network is deployed, a layer-2 gateway device (e.g., the access switch as shown in FIG. 1) which provides access for a server may be configured to be a user-EVI (U-EVI) device, and an edge device in an overlay network may be configured to be a server-EVI (S-EVI) device.

After the EVI network is established, EVI links and IS-IS neighbor relations should be first established between EVI devices.

Figure 5:
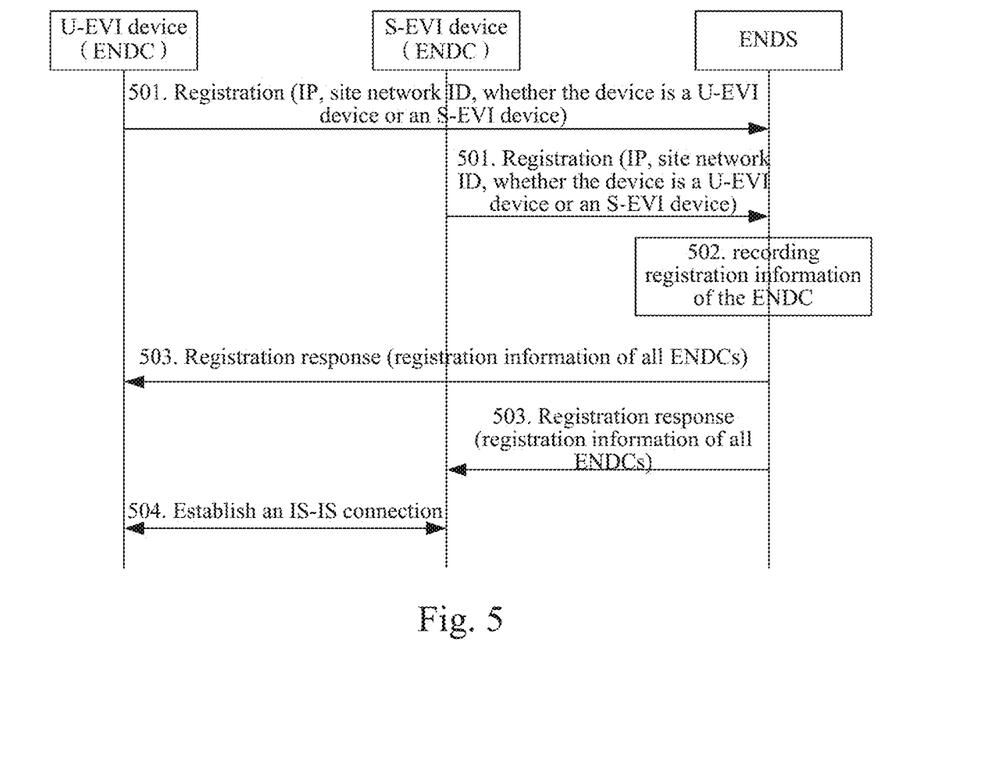
FIG. 5 is a flowchart illustrating a method of establishing an EVI link between EVI devices in accordance with examples of the present disclosure.

FIG. 5 is a flowchart illustrating a method of establishing an EVI link and an IS-IS neighbor relation between EVI devices in accordance with examples of the present disclosure. As shown in FIG. 5, the method may include the following procedures.

At block 500, when an EVI network is deployed, an access switch that has a layer-2 connection with a server is configured to be a U-EVI device, and an edge device in an overlay network is configured to be an S-EVI device.

At block 501, for each EVI device, i.e., each U-EVI device or S-EVI device, the EVI device, serving as an EVI neighbor discovery client (ENDC), sends a registration packet to an EVI neighbor discovery server (ENDS). The registration packet may include registration information of the EVI device, such as an IP address of the EVI device, an EVI instance ID, a site network ID and information of the role of the EVI device which indicates whether the EVI device serves as a U-EVI device or as an S-EVI device.

According to the conventional EVI neighbor discovery protocol (ENDP), an ENDS maintains information of all ENDCs in an EVI instance.

At block 502, the ENDS receives a registration packet sent by any ENDC, and records registration information of the ENDC in the packet.

At block 503, the ENDS loads registration information of all ENDCs recorded in the ENDS into a registration response packet, and returns the response packet to the EVI device.

At block 504, when a U-EVI device receives the registration response packet returned by the ENDS, the U-EVI device searches for registration information of an S-EVI device which belongs to the same site network with the U-EVI device in the registration information of all the ENDCs in the registration response packet; when an S-EVI device receives the registration response packet returned by the ENDS, the S-EVI device searches for registration information of each U-EVI device that belongs to the same site network with the S-EVI device in the registration information of all the ENDCs in the registration response packet, and an EVI link is established between the S-EVI device and each U-EVI device that belongs to the same site network with the S-EVI device.

An EVI link transports packets by using generic routing encapsulation (GRE) tunnels. Two devices between which an EVI link is established exchange IS-IS protocol packets over the EVI link, and establish an IS-IS neighbor relation.

If a site network includes multiple S-EVI devices, the network structure is referred to as a multi-homing network. A U-EVI device may establish an EVI link with each of the S-EVI devices respectively.

A U-EVI device establishes EVI links only with S-EVI devices in the local site network, not with any other EVI devices.

The process of establishing an EVI link between S-EVIs of different site networks may adopt a conventional mechanism or a mechanism designed according to the needs, and is not limited in the present disclosure. After EVI links between S-EVI devices are established, each S-EVI device has obtained information such as IP addresses of S-EVI devices in remote site networks and site network IDs of the remote site networks and the like.

After EVI links are established between the EVI devices, the EVI devices can begin learning the MAC address of the server.

Figure 6:
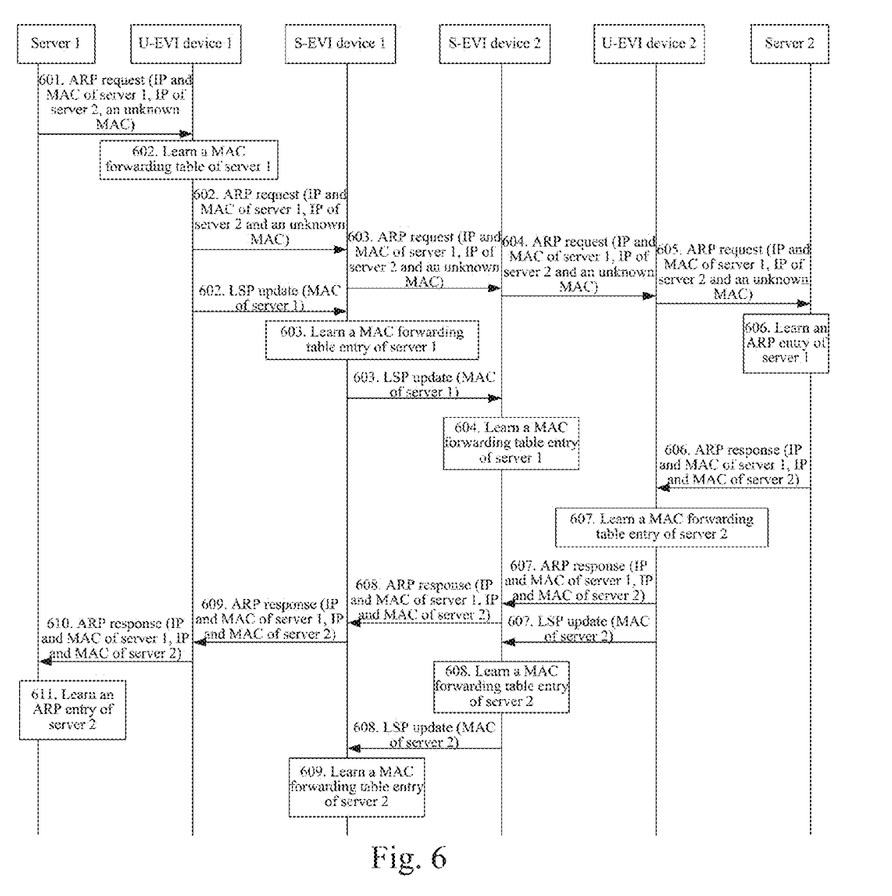
FIG. 6 is a flowchart illustrating a method of forwarding broadcast packets and a method of learning MAC addresses in an EVI network in accordance with examples of the present disclosure.

FIG. 6 is a flowchart illustrating a method of forwarding a broadcast packet and a method of learning MAC addresses in an EVI network by taking an address resolution protocol (ARP) request as an example of the broadcast packet according to examples of the present disclosure. In this example, suppose a U-EVI device has enabled functions of not learning remote MAC addresses and functions of broadcasting unknown unicast packets to S-EVI devices. As shown in FIG. 6, the method may include the following procedures.

At block 601, server 1 in site network 1 sends an ARP request. The source MAC address of the ARP request is the MAC address of server 1, and the destination MAC address of the ARP request is a broadcast address whose value is all one bits (all-F in hexadecimal format). In the packet body of the ARP request, the IP address and the MAC address of the sender are the IP address and the MAC address of server 1, the IP address of the target is the IP address of server 2 in site network 2, and the MAC address of the target is a MAC address of all zero bits. The ARP request also includes a VLAN ID of server 1.

At block 602, U-EVI device 1 in site network 1 receives the ARP request, studies a MAC forwarding table entry for forwarding packets to server 1 from the ARP request, and issues the MAC forwarding table entry to a MAC forwarding table in U-EVI device 1. U-EVI device 1 broadcasts the ARP request in a local VLAN according to the VLAN ID in the ARP request, encapsulates the ARP request and sends the encapsulated ARP request to S-EVI device 1 in site network 1. U-EVI device 1 loads the VLAN ID and the MAC address of server 1 into a link state packet (LSP) update packet, performs tunnel encapsulation on the LSP update packet and sends the encapsulated LSP update packet to each IS-IS neighbor of U-EVI device 1.

The MAC forwarding table entry for forwarding packets to server 1 learned by U-EVI device 1 may include: a user VLAN ID, a user MAC address and an egress interface ID. The user VLAN ID is the VLAN ID of server 1, the user MAC address is the MAC address of server 1, and the egress interface ID is the ID of an ingress interface via which the ARP request is received.

U-EVI device 1 may send the LSP update packet which includes the VLAN ID and the MAC address of server 1 to each IS-IS neighbor of U-EVI device 1, e.g., S-EVI device 1 in the example as shown in FIG. 4.

At block 603, S-EVI device 1 in site network 1 receives the ARP request, performs tunnel decapsulation on the ARP request, and broadcasts the ARP request in a local VLAN according to the VLAN ID in the ARP request when determining the packet is an ARP request. S-EVI device 1 may also perform tunnel encapsulation on the decapsulated ARP request, and sends the encapsulated ARP request to other U-EVI devices in the local site network and to S-EVI devices in remote site networks. S-EVI device 1 receives the LSP update packet sent by U-EVI device 1, performs tunnel decapsulation on the LSP update packet, and studies a MAC forwarding table entry for forwarding packets to server 1 from the LSP update packet when determining the packet received is an LSP update packet. S-EVI device 1 issues the learned MAC forwarding table entry into a MAC forwarding table in S-EVI device 1, performs tunnel encapsulation on the decapsulated LSP update packet and sends the encapsulated LSP update packet to each IS-IS neighbor of S-EVI device 1.

IS-IS neighbors of S-EVI device 1 may include each U-EVI device in the local site network, i.e., site network 1, and S-EVI devices in remote site networks. As such, the MAC forwarding table entry for server 1 can be learned by all U-EVI devices in site network 1.

The MAC forwarding table entry for server 1 learned by S-EVI device 1 may include: a VLAN ID, a MAC address and information of an egress interface. The VLAN ID is the VLAN ID of server 1, the MAC address is the MAC address of server 1, and the information of the egress interface is the IP address of U-EVI device 1.

At block 604, in any remote site network, e.g., site network 2, S-EVI device 2 in site network 2 receives the ARP request from an EVI tunnel, performs tunnel decapsulation on the ARP request, and broadcasts the ARP request in a local VLAN corresponding to the ARP request when determining the packet received is an ARP request. S-EVI device 2 performs tunnel encapsulation on the decapsulated ARP request and sends the encapsulated ARP request to each U-EVI device in the local site network, i.e., site network 2. S-EVI device 2 receives the LSP update packet sent by S-EVI device 1, performs tunnel decapsulation on the received packet, studies a MAC forwarding table entry for forwarding packets to server 1 from the packet when determining the packet received is an LSP update packet, and issues the learned MAC forwarding table entry to a local MAC forwarding table.

The MAC forwarding table entry directing to server 1 learned by S-EVI device 2 may include: a VLAN ID, a MAC address and information of an egress interface. The VLAN ID is the VLAN ID of server 1, the MAC address is the MAC address of server 1, and the information of the egress interface is the IP address of S-EVI device 1.

A U-EVI device may decide whether to learn remote MAC addresses based on the capacity of a MAC forwarding table in the U-EVI device. For example, a U-EVI device may decide to learn remote MAC addresses if the capacity of a local MAC forwarding table is relatively large; and a U-EVI device may decide not to learn remote MAC addresses if the capacity of a local MAC forwarding table is relatively small. In various examples, a U-EVI device has enabled functions of not learning remote MAC addresses, thus S-EVI device 2 does not send the LSP update packet to the U-EVI device in site network 2.

When a U-EVI device has enabled functions of not learning remote MAC addresses, the U-EVI device may notify an S-EVI device in the local site network that the U-EVI device has enabled not learning remote MAC addresses. After receiving the notification, the S-EVI device stops sending LSP update packets that includes MAC addresses to the U-EVI device, which can reduce consumption of device processing capacity and link bandwidth.

At block 605, any U-EVI device in site network 2, e.g., U-EVI device 2, receives the ARP request, performs tunnel decapsulation on the ARP packet, and broadcasts the ARP request in a local VLAN according to the VLAN ID in the packet after determining the packet received is an ARP request.

At block 606, server 2 in site network 2 receives the ARP packet, studies an ARP table entry directing to server 1 based on the IP address and MAC address of the sender in the packet when determining the destination IP address in the packet is the IP address of server 2, constructs an ARP response and sends the ARP response to U-EVI device 2 which is connected to server 2. In the ARP response, the source MAC address is the MAC address of server 2, and the destination MAC address is the MAC address of server 1. In the packet body of the ARP response, the IP address and the MAC address of the sender are the IP address and the MAC address of server 2, and the IP address and the MAC address of the target are the IP address and the MAC address of server 1.

At block 607, U-EVI 2 receives the ARP response, studies a MAC forwarding table entry for forwarding packets to server 2, and issues the MAC forwarding table entry to a local MAC forwarding table. U-EVI 2 performs tunnel encapsulation on the ARP response and sends the encapsulated ARP response to S-EVI 2 which is connected to U-EVI 2. U-EVI 2 loads the VLAN ID and the MAC address of server 2 into an LSP update packet, performs tunnel encapsulation on the LSP update packet and sends the encapsulated LSP update packet to each IS-IS neighbor of U-EVI 2.

The MAC forwarding table entry for forwarding packets to server 2 learned by U-EVI device 2 may include: a user VLAN ID which is the VLAN ID of server 2, a user MAC address which is the MAC address of server 2, and an egress interface ID which is the ingress interface ID of the ARP response.

U-EVI device 2 may send the LSP update packet which includes the VLAN ID and the MAC address of server 2 to each IS-IS neighbor of U-EVI device 2, e.g., S-EVI device 2 in the example as shown in FIG. 4.

At block 608, S-EVI device 2 receives the ARP response, performs tunnel decapsulation on the ARP response, searches in a local MAC forwarding table for an entry corresponding to the VLAN ID and destination MAC address in the ARP response after determining the packet received is an ARP response, performs tunnel encapsulation on the ARP response and sends the encapsulated ARP response to S-EVI device 1 according to information of an egress interface in the entry found, i.e., the IP address of S-EVI device 1. S-EVI device 2 receives the LSP update packet sent by U-EVI device 2, performs tunnel decapsulation on the packet, studies a MAC forwarding table entry for forwarding packets to server 2 from the packet after determining the packet received is an LSP update packet, issues the MAC forwarding table entry to a local MAC forwarding table. S-EVI device 2 performs tunnel encapsulation on the LSP update packet and sends the encapsulated LSP update packet to each IS-IS neighbor of S-EVI device 2.

The MAC forwarding table entry directing to server 2 learned by S-EVI device 2 may include: a VLAN ID, a MAC address and information of an egress interface. The VLAN ID is the VLAN ID of server 2, the MAC address is the MAC address of server 2, and the information of the egress interface is the IP address of U-EVI device 2.

At block 609, S-EVI device 1 receives the ARP response, performs tunnel decapsulation on the ARP response, searches a local MAC forwarding table for an entry corresponding to the VLAN ID, the destination MAC address in the packet after determining the received packet is an ARP response, performs tunnel encapsulation on the ARP response and sends the encapsulated ARP response to U-EVI device 1 according to information of an egress interface in the entry found, i.e., the IP address of U-EVI 1. S-EVI device 1 receives the LSP update packet sent by S-EVI device 2, performs tunnel decapsulation on the packet, studies a MAC forwarding table entry directing to server 2 from the packet after determining the packet is an LSP update packet, and issues the MAC forwarding table entry to a local MAC forwarding table.

The MAC forwarding table entry for server 2 learned by S-EVI device 1 may include: a VLAN ID, a MAC address and information of an egress interface. The VLAN ID is the VLAN ID of server 2, the MAC address is the MAC address of server 2, and the information of the egress interface is the IP address of S-EVI device 2.

In various examples, a U-EVI device has enabled functions of not learning remote MAC addresses, and S-EVI device 1 does not send the LSP update packet to the U-EVI device in the local site network.

At block 610, U-EVI device 1 receives the ARP response, performs tunnel decapsulation on the packet, searches a local MAC forwarding table based on the VLAN ID, the destination MAC address in the packet after determining the packet is an ARP response, and sends the ARP response to server 1 according to the egress interface in an entry found.

At block 611, server 1 receives the ARP response, and studies an ARP entry directing to server 2 based on the IP address and the MAC address of the sender in the packet.

The above process of learning MAC addresses merely takes the process of forwarding an ARP request packet as an example. In other examples, the process of learning MAC addresses may also be performed in the process of forwarding a unicast packet or a multicast packet besides a broadcast packet. The process of learning MAC addresses during transmission of other packets is similar to that as shown in FIG. 6, may include a procedure of generating a MAC forwarding table entry, a procedure of issuing the MAC forwarding table entry to a local MAC forwarding table, a procedure of generating an LSP update packet and a procedure of forwarding the LSP update packet and the like.

Figure 7:
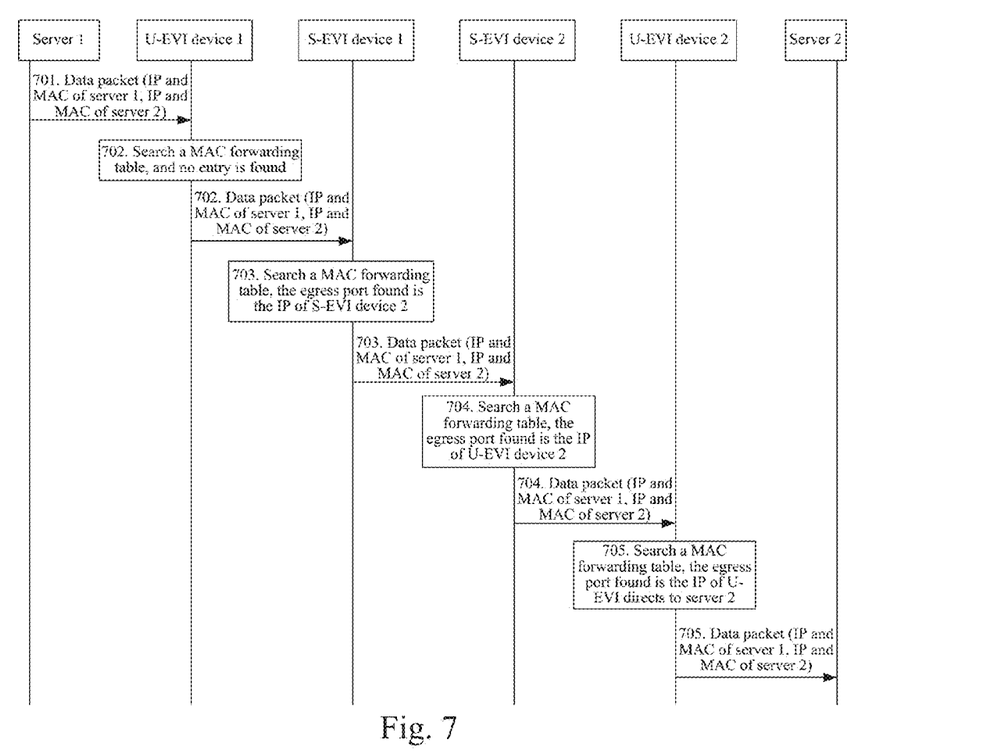
FIG. 7 is a flowchart illustrating a method of forwarding unicast packets in an EVI network in accordance with examples of the present disclosure.

FIG. 7 is a flowchart illustrating a method of forwarding unicast packets in an EVI network in accordance with examples of the present disclosure. In this example, it is supposed a U-EVI device has enabled functions of not learning remote MAC addresses and functions of broadcasting unknown unicast packets to S-EVI devices. As shown in FIG. 7, the method may include the following procedures.

At block 701, server 1 in site network 1 sends a data packet. In the data packet, the destination IP address and the destination MAC address are the IP address and the MAC address of server 2 in site network 2. The data packet also includes a VLAN ID of server 1.

At block 702, U-EVI device 1 in site network 1 receives the data packet, searches a local MAC forwarding table based on the VLAN ID and the destination MAC address in the data packet, and determines that the data packet is an unknown unicast packet if no MAC forwarding table entry is found. U-EVI device 1 broadcasts the data packet in a local VLAN according to the VLAN ID in the data packet. Since the functions of broadcasting unknown unicast packets to S-EVI devices are enabled in U-EVI device 1, U-EVI device 1 performs tunnel encapsulation on the data packet, and sends the encapsulated data packet to S-EVI device 1 in the local site network, i.e., site network 1.

At block 703, S-EVI device 1 receives the data packet, performs tunnel decapsulation on the data packet, searches a local MAC forwarding table for an entry corresponding to the VLAN ID, the destination MAC address in the data packet, performs tunnel encapsulation on the decapsulated data packet, and sends the encapsulated data packet to S-EVI device 2 by using information of an egress interface in the entry found, i.e., the IP address of S-EVI device 2.

At block 704, S-EVI device 2 receives the data packet, performs tunnel decapsulation on the data packet, searches a local MAC forwarding table for an entry corresponding to the VLAN ID, the destination MAC address in the data packet, performs tunnel encapsulation on the data packet, and sends the encapsulated data packet to U-EVI device 2 by using information of an egress interface in the entry found, i.e., the IP address of U-EVI device 2.

At block 705, U-EVI 2 receives the data packet, performs tunnel decapsulation on the data packet, searches a local MAC forwarding table for an entry corresponding to the VLAN ID and the destination MAC address in the data packet, and sends the data packet to server 2 based on an egress interface ID in the entry found.

As can be seen from the process shown in FIG. 7, an S-EVI device does not send an LSP update packet which includes a MAC address of a server in a remote site network to a U-EVI device which has enabled functions of not learning remote MAC addresses, and the U-EVI device only studies MAC forwarding table entries directing to local users which do not require the capacity of the MAC forwarding table to be very large. In various examples, if a U-EVI device has a MAC forwarding table with a large enough capacity, the U-EVI device may not enable the functions of not learning remote MAC addresses and the functions of broadcasting unknown unicast packets to S-EVIs. An S-EVI device in the same site network with the U-EVI device may send an LSP update packet sent by a remote S-EVI device to the U-EVI device so that the U-EVI device studies a MAC forwarding table entry directing to a server in a remote site network. After receiving a data packet sent by a server in the local site network, the U-EVI device may only broadcast the packet within a local VLAN by using a VLAN ID in the data packet if an entry corresponding to the data packet is not found in a local MAC forwarding table, and does not send the data packet to an S-EVI device in the local site network.

In various examples, an S-EVI device may have functions supporting a multi-homing network of U-EVI devices, i.e., a U-EVI device in a site network may be connected to plural S-EVI devices. The plural S-EVI devices may negotiate with each other to determine respective active user VLANs, and inform U-EVI devices of respective active user VLANs through IS-IS protocol packets. When a U-EVI device sends a data packet or a packet conforming to a control protocol (also referred to as control protocol message), the U-EVI device may send the packet to an S-EVI device which has activated a user VLAN corresponding to a user VLAN ID in the packet. When an S-EVI device malfunctions, other S-EVI devices may negotiate again to determine respective active user VLANs, and inform U-EVI devices of the newly determined active user VLANs through an IS-IS packet.

In various examples, U-EVI devices and S-EVI devices may be deployed in some of the EVI site networks, and other site networks may adopt a conventional deployment mechanism, e.g., EVI functions are enabled only in edge devices.

Figure 8:
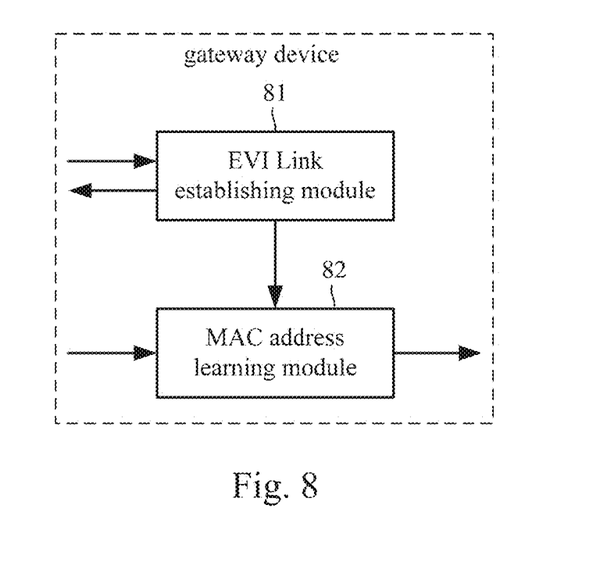
FIG. 8 is a block diagram illustrating modules of a gateway device in a layer-2 network in accordance with examples of the present disclosure.

FIG. 8 is a block diagram illustrating modules of a gateway device in a layer-2 network in accordance with examples of the present disclosure. The device is in an EVI site network of a cross-site layer-2 virtual interconnection network. The device may be a device providing network access services for terminals. The device is connected to an edge device in a layer-3 network in the EVI site network. As shown in FIG. 8, the gateway device in the layer-2 network may include: an EVI link establishing module 81, a MAC address learning module 82 and a packet forwarding module 83.

The EVI link establishing module 81 may establish an EVI link and an IS-IS neighbor relation with an edge device in a layer-3 network in a local site network, record information of an IS-IS neighbor which may include an IP address, a site network ID, information of a role of the EVI device (i.e., the IS-IS neighbor) and the like.

The MAC address learning module 82 may receive an ARP request sent by a first terminal in the local site network. In the ARP request, a source MAC address is the MAC address of the first terminal, the destination MAC address is a broadcast address of all one bits (i.e., all-F in hexadecimal format). In the body of the ARP request, an IP address and a MAC address of a sender are the IP address and the MAC address of the first terminal, a destination IP address is an IP address of a second terminal in a remote site network and a destination MAC address is a MAC address of all zero bits.

The ARP request includes a user VLAN ID of the first terminal. The MAC address learning module 82 may learn a MAC forwarding table entry for forwarding packets to the first terminal from the ARP request, and issue the MAC forwarding table entry to a local MAC forwarding table. The MAC address learning module 82 may broadcast the ARP request within a local VLAN based on the user VLAN ID in the ARP request. The MAC address learning module 82 may perform tunnel encapsulation on the ARP request and send the encapsulated ARP request to a layer-3 edge device in the local site network according to information of an IS-IS neighbor recorded in the EVI link establishing module 81. The MAC address learning module 82 may send the MAC address of the first terminal to a layer-3 edge device in the local site network via an IS-IS LSP update packet so that the layer-3 edge device may establish a MAC forwarding table entry for forwarding packets to the first terminal by using the LSP update packet and send the LSP update packet to other layer-2 gateway devices in the local site network and edge devices in remote site networks.

The packet forwarding module 83 may receive a data packet sent by a terminal in the local site network, searches a local MAC forwarding table for an entry corresponding to a destination MAC address in the data packet, broadcast the data packet within a local VLAN according to a VLAN ID in the data packet and forward the data packet to a layer-3 edge device in the local site network if no entry is found and the functions of not learning remote MAC addresses and the functions of broadcasting unknown unicast packets to layer-3 edge devices are enabled.

In various examples, when the layer-2 gateway device has enabled the functions of not learning remote MAC addresses and the functions of broadcasting unknown unicast packets to layer-3 edge devices, the layer-2 gateway device as shown in FIG. 8 may also include an enablement information sending module. The enablement information sending module may send information of the layer-2 gateway device having enabled functions of not learning remote MAC addresses to a layer-3 edge device in the local site network via a packet conforming to the IS-IS protocol by using information of IS-IS neighbors recorded by the EVI link establishing module 81, so that the layer-3 edge device is not going to forward a received LSP update packet which includes a MAC address of a terminal in a remote site network to the layer-2 gateway device.

In various examples, when the layer-2 gateway device has enabled functions of learning remote MAC addresses and functions of not broadcasting unknown unicast packets to layer-3 edge devices, the MAC address learning module 82 may receive an LSP update packet which is sent by a layer-3 edge device in the local site network and includes a MAC address of a terminal in a remote site network, and learn a MAC forwarding table entry for forwarding packets to the terminal in the remote site network by using the LSP update packet.

The packet forwarding module 83 may receive a data packet sent by a terminal in the local site network, search a local MAC forwarding table for an entry corresponding to a destination MAC address in the data packet, and broadcast the data packet only in a local VLAN corresponding to a user VLAN ID in the data packet if the entry is not found and the functions of learning remote MAC addresses and functions of not broadcasting unknown unicast packets to layer-3 edge devices have been enabled.

In various examples, when the site network where the layer-2 gateway device is located includes plural layer-3 edge devices and different user VLANs are active in different layer-3 edge devices, the layer-2 gateway device as shown in FIG. 8 may also include: a user VLAN recording module. The user VLAN recording module may receive from a layer-3 edge device in the local site network an IS-IS packet which includes an ID of a user VLAN which is active in the layer-3 edge device, and record the active user VLAN ID in the layer-3 edge device.

The MAC address learning module 82 may search in the user VLAN recording module for a layer-3 edge device in which a user VLAN corresponding to a user VLAN ID in an ARP request is active, and send the ARP request to the layer-3 edge device found.

In various examples, the user VLAN recording module may receive an IS-IS packet which includes an updated active user VLAN ID of the layer-3 edge device sent by the layer-3 edge device in the local site network, update recorded active user VLAN ID of the layer-3 edge device. The updated active user VLAN ID may be a user VLAN ID which is active in the layer-3 edge device after a layer-3 edge device malfunctioned and the other layer-3 edge devices negotiated with each other again to decide respective active user VLAN IDs.

Figure 9:
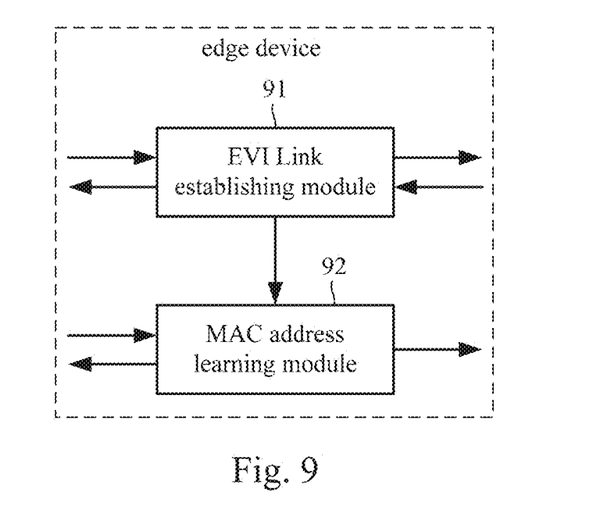
FIG. 9 is a block diagram illustrating modules of an edge device in a layer-3 network in accordance with examples of the present disclosure.

FIG. 9 is a block diagram illustrating modules of an edge device in a layer-3 network in accordance with examples of the present disclosure. The device is located in a cross-site virtually interconnected network. The device may be an edge device in an overlay network. The device is connected with a layer-2 gateway device in the same site network. The layer-2 gateway device may be a device providing network access services for terminals. As shown in FIG. 9, the layer-3 edge device may include: an EVI link establishing module 91, a MAC address learning module 92 and a packet forwarding module 93.

The EVI link establishing module 91 may establish an EVI link with a layer-2 gateway device in a local site network and with each edge device in remote site networks, record information of each IS-IS neighbor. The information of an IS-IS neighbor may include an IP address, a site network ID, information of a role of the EVI device (i.e., the IS-IS neighbor) and the like.

The MAC address learning module 92 may receive an ARP request sent by a layer-2 gateway device in the local site network, broadcast the ARP request within a local VLAN according to a VLAN ID in the ARP request, and send the ARP packet to other layer-2 gateway devices in the local site network and edge devices in remote site networks based on information of IS-IS neighbors recorded by the EVI link establishing module 91. The MAC address learning module 92 may receive an LSP update packet which is sent by a layer-2 gateway device in the local site network and includes a MAC address of a first terminal in the local site network, learn a MAC forwarding table entry for forwarding packets to the first terminal, and forward the LSP update packet to each IS-IS neighbor of the layer-3 edge device by using information of IS-IS neighbors recorded by the EVI link establishing module 91.

The MAC address learning module 92 may receive an ARP request sent by an edge device in a remote site network, broadcast the ARP request in a local VLAN based on a user VLAN ID in the ARP request, and forward the ARP packet to each layer-2 gateway device in the local site network based on information of IS-IS neighbors recorded by the EVI link establishing module 91. The MAC address learning module 92 may receive an LSP update packet which is sent by an edge device in a remote site network and includes a MAC address of a second terminal in the remote site network, and learn a MAC forwarding table entry for forwarding packets to the second terminal.

The MAC address learning module 92 may not forward an LSP update packet which includes a MAC address of a terminal in a remote site network to a layer-2 gateway device in the local site network after receiving a notification sent by the layer-2 gateway device indicating the layer-2 gateway device has enabled functions of not learning remote MAC addresses.

The packet forwarding module 93 may receive a data packet sent by an edge device in a remote site network via an EVI link, perform EVI decapsulation on the data packet, search a local MAC forwarding table by using a VLAN ID and a destination MAC address in the decapsulated data packet, forward the data packet according to an entry found in the MAC forwarding table, or broadcast the data packet in a local VLAN, perform EVI encapsulation on the data packet and send the encapsulated data packet to a layer-2 gateway device via an EVI link if no entry is found.

When the site network where the layer-3 edge device is located has plural layer-3 edge devices and different user VLANs are active in different layer-3 edge devices, the layer-3 edge device as shown in FIG. 9 may also include an active user VLAN informing module. The active user VLAN informing module may inform each layer-2 gateway device in the local site network of an active user VLAN ID of the layer-3 edge device via an IS-IS packet.

The active user VLAN informing module may detect a layer-3 edge device malfunctions, negotiate with other layer-3 edge device that are running normally to determine respective active user VLAN IDs, inform each layer-2 gateway device in the local site network of the updated active user VLAN ID of the layer-3 edge device via an IS-IS packet by using information of IS-IS neighbors recorded by the EVI link establishing module 91.

Figure 10:
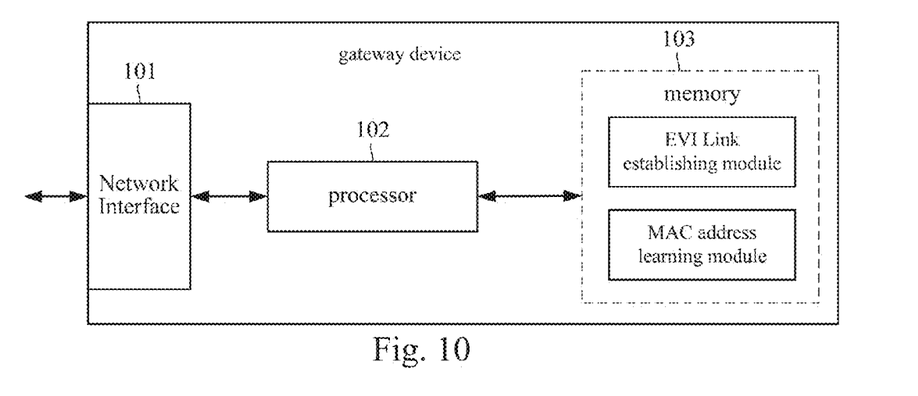
FIG. 10 is a block diagram illustrating modules of a gateway device in a layer-2 network in accordance with examples of the present disclosure.

FIG. 10 is a block diagram illustrating modules of a gateway device in a layer-2 network in accordance with examples of the present disclosure. The device is in an EVI site network of a cross-site layer-2 virtual interconnection network. The device may be a device providing network access services for terminals. The device is connected to a layer-3 edge device in the EVI site network. As shown in FIG. 10, the layer-2 gateway device may include a network interface 101, a processor 102 and a memory 103.

The network interface 101 may exchange data packets with a terminal in a local site network, receive information of a MAC address sent by a terminal in the local site network, and exchange information of MAC addresses and data packets with a layer-3 edge device in the local site network.

The processor 102 may communicate with the memory 103 and execute computer program codes in the memory 103.

The memory 103 stores computer program codes which are capable of implementing the method of any example of the present disclosure when executed by the processor 102, e.g., establishing an EVI link with a layer-3 edge device in a local site network, establishing an IS-IS neighbor relation with the layer-3 edge device in the local site network by using the EVI link; informing an IS-IS neighbor of information of a MAC address learned by the device by using the EVI link so that the layer-3 edge device in the local site network studies the information of the MAC address; receiving a packet sent by the layer-3 edge device in the local site network via the EVI link, performing tunnel decapsulation on the packet, searching a local MAC forwarding table by using a VLAN ID and a destination MAC ID in the decapsulated packet and forwarding the packet in the local site network according to an entry found, or broadcasting the packet in a VLAN corresponding to the packet if no entry is found in the MAC forwarding table. The memory 103 may store machine-readable instructions corresponding to an EVI link establishing module and an MAC address learning module which have similar functions to the EVI link establishing module 81 and an MAC address learning module 82 as shown in FIG. 8.

Figure 11:
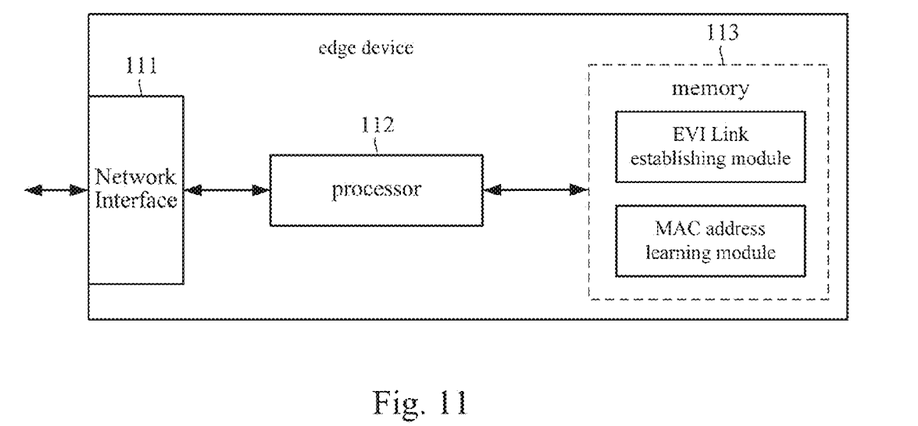
FIG. 11 is a block diagram illustrating modules of an edge device in a layer-3 network in accordance with examples of the present disclosure.

FIG. 11 is a block diagram illustrating modules of an edge device in a layer-3 network in accordance with examples of the present disclosure. The device is located in a cross-site virtually interconnected network. The device may be an edge device of an overlay network. The device is connected with a layer-2 gateway device in a local site network. The layer-2 gateway device may be a device providing network access services for terminals. As shown in FIG. 11, the layer-3 edge device may include a network interface 111, a processor 112 and a memory 113.

The network interface 111 may exchange information of MAC addresses and data packets with a layer-2 gateway device in a local site network, exchange information of MAC addresses and data packets with edge devices in remote site networks.

The processor 112 may communicate with the memory 113 and execute computer program codes in the memory 113.

The memory 113 stores computer program codes which are capable of implementing the method of any example of the present disclosure when executed by the processor 112, e.g., establishing EVI links with layer-2 gateway devices in the local site network and edge devices in remote site networks, establishing IS-IS neighbor relations with layer-2 gateway devices in a local site network and edge devices in remote site networks via the EVI links; learning information of MAC addresses sent by the layer-2 gateway devices in the local site network, and sending the information of the MAC addresses to the edge devices in the remote site networks; receiving an EVI packet sent by an edge device in a remote site network via an EVI link, performing tunnel decapsulation on the EVI packet, searching a local MAC forwarding table by using an VLAN ID and a destination MAC address in the decapsulated packet and forwarding the packet in the local site network according to a search result; if no search result is found in the MAC forwarding table, broadcasting the packet within a local VLAN corresponding to the packet, performing EVI encapsulation on the packet and sending the encapsulated packet to the layer-2 gateway devices in the local site network via an EVI link. The memory 113 may store machine-readable instructions corresponding to an EVI link establishing module and an MAC address learning module which have similar functions to the EVI link establishing module 91 and an MAC address learning module 92 as shown in FIG. 9.

The storage medium for providing the program codes may include floppy disk, hard drive, magneto-optical disk, compact disk (such as CD-ROM, CD-R, CD-RW, DVD-ROM, DVD-RAM, DVD-RW, DVD+RW), magnetic tape drive, Flash card, ROM and so on.

It should be understood that in the above processes and structures, not all of the procedures and modules are necessary. Certain procedures or modules may be omitted according to the needs. The order of the procedures is not fixed, and can be adjusted according to the needs. The modules are defined based on function simply for facilitating description. In implementation, a module may be implemented by multiple modules, and functions of multiple modules may be implemented by the same module. The modules may reside in the same device or distribute in different devices. The "first", "second" in the above descriptions are merely for distinguishing two similar objects, and have no substantial meanings.

In various embodiments, a module may be implemented by hardware and or machine-executable instructions. For example, a hardware module may comprise dedicated circuitry or logic that is permanently configured (e.g., as a special-purpose processor, such as a field programmable gate array (FPGA) or an application-specific integrated circuit (ASIC)) to perform certain operations. A module may also comprise programmable logic or circuitry (e.g., as encompassed within a general-purpose processor or other programmable processor) that is temporarily configured by software to perform certain operations. It will be appreciated that the decision to implement a hardware module mechanically, in dedicated and permanently configured circuitry, or in temporarily configured circuitry (e.g., configured by software) may be driven by cost and time considerations.

A machine-readable storage medium is also provided, which is to store instructions to cause a machine to execute a method as described herein. Specifically, a system or apparatus having a storage medium which stores machine-readable program codes for implementing functions of any of the above examples and which may make the system or the apparatus (or CPU or MPU) read and execute the program codes stored in the storage medium. In addition, instructions of the program codes may cause an operating system running in a computer to implement part or all of the operations. In addition, the program codes implemented from a storage medium are written in a storage device in an extension board inserted in the computer or in a storage in an extension unit connected to the computer. In this example, a CPU in the extension board or the extension unit executes at least part of the operations according to the instructions based on the program codes to realize the technical scheme of any of the above examples.

The storage medium for providing the program codes may include floppy disk, hard drive, magneto-optical disk, compact disk (such as CD-ROM, CD-R, CD-RW, DVD-ROM, DVD-RAM, DVD-RW, DVD+RW), magnetic tape drive, Flash card, ROM and so on. Optionally, the program code may be downloaded from a server computer via a communication network.

The scope of the claims should not be limited by the embodiments set forth in the examples, but should be given the broadest interpretation consistent with the description as a whole.

The invention claimed is:

1. A method comprising:
  establishing, by a layer-2 gateway device in a first site network, a virtual link with a layer-3 edge device in the first site network;
  establishing, by the layer-2 gateway device, an intermediate system-intermediate system (IS-IS) neighbor relation with the layer-3 edge device by using the virtual link;
  sending, by the layer-2 gateway device via the virtual link, information of a MAC address learned by the layer-2 gateway device to at least one IS-IS neighbor including the layer-3 edge device to enable the layer-3 edge device to learn the information of the MAC address and to provide the information of the MAC address for a second edge device in a second site network; and
  receiving, by the layer-2 gateway device, a packet from the layer-3 edge device via the virtual link, performing tunnel decapsulation on the packet, searching a local MAC forwarding table for an entry by using a virtual local area network (VLAN) ID and a destination MAC address in the decapsulated packet, and forwarding the packet within the first site network according to an entry found in the MAC forwarding table or broadcasting the packet in a local VLAN corresponding to the packet if no entry is found in the MAC forwarding table.

2. The method of claim 1, further comprising:
  sending, by the layer-2 gateway device to the layer-3 edge device, a notification indicating functions of not learning remote MAC addresses have been enabled in the layer-2 gateway device to instruct the layer-3 edge device not to send information of remote MAC addresses to the layer-2 gateway device;
  receiving, by the layer-2 gateway device, a packet sent by a terminal device which accesses a layer-2 network via the layer-2 gateway device, searching the local MAC forwarding table to forward the packet; and
  if no entry is found in the local MAC forwarding table, broadcasting the packet in a local VLAN corresponding to the packet and sending the packet to the layer-3 edge device via the virtual link after performing encapsulation on the packet if the packet is a broadcast packet, or broadcasting the packet only in a local VLAN corresponding to the packet if the packet is an unknown multicast packet, or sending the packet only to the layer-3 edge device via the virtual link after performing encapsulation on the packet if the packet is an unknown unicast packet.

3. The method of claim 1, further comprising:
  sending, by the layer-2 gateway device to the layer-3 edge device, a notification indicating functions of learning remote MAC addresses have been enabled in the layer-2 gateway device to instruct the layer-3 edge device to send information of remote MAC addresses to the layer-2 gateway device;
  learning, by the layer-2 gateway device, information of a MAC address received from the layer-3 edge device via the virtual link;
  searching, by the layer-2 gateway device, the local MAC forwarding table to forward a packet sent by a local terminal; and
  if no search result is found in the local MAC forwarding table, broadcasting the packet in a local VLAN corresponding to the packet and sending the packet to the layer-3 edge device via the virtual link after performing tunnel encapsulation on the packet if the packet is a broadcast packet, or broadcasting the packet only in the local VLAN corresponding to the packet if the packet is an unknown multicast packet or an unknown unicast packet.

4. The method of claim 2, further comprising:
  establishing, by the layer-2 gateway device, a virtual link with each of at least two layer-3 edge devices in the first site network; wherein the at least two layer-3 edge devices correspond to different user VLANs;
  determining, by the layer-2 gateway device, a layer-3 edge device corresponding to a user VLAN to which a packet belongs, and sending the encapsulated packet to the determined layer-3 edge device via the virtual link after performing encapsulation on the packet.

5. The method of claim 1, wherein the virtual link is an Ethernet virtual interconnect (EVI) link and the first and second site networks are EVI site networks.

6. A method comprising:
establishing, by a layer-3 edge device in a first site network, a virtual link with a layer-2 gateway device in the first site network;
establishing, by the layer-3 edge device, an IS-IS neighbor relation with the layer-2 gateway device and an IS-IS neighbor relation with a second edge device located in a second site network;
learning, by the layer-3 edge device, information of a MAC address sent by the layer-2 gateway device, and sending the information of the learned MAC address to the second edge device;
receiving, by the layer-3 edge device, a packet sent by the second edge device via a virtual link, performing tunnel decapsulation on the packet, searching a local MAC forwarding table by using a VLAN ID and a destination MAC address in the decapsulated packet, and forwarding the packet within a local site network according to a search result; and
if no search result is found, broadcasting the packet in a local VLAN corresponding to the packet, and sending the packet to the layer-2 gateway device via the virtual link after performing encapsulation on the packet.

7. The method of claim 6, further comprising:
receiving, by the layer-3 edge device, a packet sent by the layer-2 gateway device via the link, performing tunnel decapsulation on the packet, searching the local MAC forwarding table by using a VLAN ID and a destination MAC address in the decapsulated packet to forward the packet; if no search result is found, broadcasting the packet in a local VLAN corresponding to the packet, and sending the packet to the second edge device via a virtual link after performing encapsulation on the packet.

8. The method of claim 7, further comprising:
if no search result is found, sending the packet to a second layer-2 gateway device in the first site network via a virtual link after performing encapsulation on the decapsulated packet.

9. The method of claim 6, further comprising:
receiving, by the layer-3 edge device, a notification sent by the layer-2 gateway device indicating functions of not learning remote MAC addresses are enabled in the layer-2 gateway device, sending information of MAC addresses to IS-IS neighbors except the layer-2 gateway device;
receiving, by the layer-3 edge device, a notification sent by the layer-2 gateway device indicating functions of learning remote MAC addresses are enabled in the layer-2 gateway device, sending information of MAC addresses to IS-IS neighbors including the layer-2 gateway device.

10. A layer-2 gateway device, comprising:
a virtual link establishing module, to establish a virtual link with a layer-3 edge device in a first site network where the layer-2 gateway device is located, to establish an IS-IS neighbor relation with the layer-3 edge device via the virtual link;
a MAC address learning module, to inform an IS-IS neighbor of information of a MAC address learned by the layer-2 gateway device via the virtual link to enable the layer-3 edge device to learn the information of the MAC address and provide the information of the MAC address for a second edge device in a second site network; and
a packet forwarding module, to receive a packet sent by the layer-3 edge device via the virtual link, to perform tunnel decapsulation on the packet, to search a local MAC forwarding table by using a virtual local area network (VLAN) ID and a destination MAC address in the decapsulated packet, and to forward the packet within the first site network by using a search result, or to broadcast the packet in a local VLAN corresponding to the packet if no search result is found in the MAC forwarding table.

11. The layer-2 gateway device of claim 10, further comprising: an enablement information sending module, to send a notification to the layer-3 edge device indicating functions of not learning remote MAC addresses have been enabled to instruct the layer-3 edge device not to send information of remote MAC addresses to the layer-2 gateway device;
the packet forwarding module is further to receive a packet sent by a terminal device which accesses a layer-2 network via the layer-2 gateway device, to search the local MAC forwarding table to forward the packet, and, if no search result is found in the local MAC forwarding table, to broadcast the packet in a local VLAN corresponding to the packet and to send the packet to the layer-3 edge device via the virtual link after performing encapsulation on the packet if the packet is a broadcast packet, or to broadcast the packet only in a local VLAN corresponding to the packet if the packet is an unknown multicast packet, or to send the packet only to the layer-3 edge device via the virtual link after performing encapsulation on the packet if the packet is an unknown unicast packet.

12. The layer-2 gateway device of claim 10, further comprising: an enablement information sending module, to send a notification to the layer-3 edge device indicating functions of learning remote MAC addresses have been enabled in the layer-2 gateway device to instruct the layer-3 edge device to send information of remote MAC addresses to the layer-2 gateway device;
wherein the MAC address learning module is further to learn information of a MAC address if the information of the MAC address is received from the layer-3 edge device via the virtual link;
the packet forwarding module is further to receive a packet sent by a terminal device which accesses a layer-2 network via the layer-2 gateway device, search the local MAC forwarding table to forward the packet, and, if no search result is found in the local MAC forwarding table, to broadcast the packet in a local VLAN corresponding to the packet and to send the packet to the layer-3 edge device after performing encapsulation on the packet if the packet is a broadcast packet, or to broadcast the packet only in the local VLAN corresponding to the packet if the packet is an unknown multicast packet or an unknown unicast packet.

13. The layer-2 gateway device of claim 11,
wherein the virtual link establishing module is further to establish a virtual link and an IS-IS neighbor relation with each of at least two layer-3 edge devices in the first site network, the at least two layer-3 edge devices corresponding to different user VLANs; and
the packet forwarding module is further to determine a layer-3 edge device corresponding to a user VLAN to which a packet belongs, and send the packet to the determined layer-3 edge device via a virtual link after performing encapsulation on the packet.

14. A layer-3 edge device, comprising:
a virtual link establishing module, to establish a virtual link with each of at least one layer-2 gateway device in a first site network where the layer-3 edge device belongs and a second edge device in a second site network, and to establish an IS-IS neighbor relation with each of the at least one layer-2 gateway devices and the second edge device;
a MAC address learning module, to learn information of a MAC address sent by the layer-2 gateway device, and to send the information of the MAC address to the second edge device; and
a packet forwarding module, to receive a packet sent by an edge device located in another site network via a virtual link, to perform decapsulation on the packet, to search a local MAC forwarding table by using a VLAN ID and a destination MAC address in the decapsulated packet, to forward the packet in the first site network according to a search result, and, if no search result is found, to broadcast the packet in a local VLAN corresponding to the packet, to perform encapsulation on the packet, and to send the encapsulated packet to the layer-2 gateway device via the virtual link.

15. The layer-3 edge device of claim 14, wherein the packet forwarding module is further to receive a packet sent by the layer-2 gateway device via the virtual link, to perform tunnel decapsulation on the packet, to search the local MAC forwarding table by using a VLAN ID and a destination MAC address in the decapsulated packet to forward the packet according to a search result, and, if no search result is found, to broadcast the packet in a local VLAN corresponding to the packet, to perform encapsulation on the packet and to send the packet to the second edge device via the virtual link.

16. The layer-3 edge device of claim 14, wherein the MAC address learning module is further to send information of a MAC address to IS-IS neighbors except the layer-2 gateway device if the module receives a notification sent by the layer-2 gateway device indicating functions of not learning remote MAC addresses have been enabled in the layer-2 gateway device, and to send information of a MAC address to IS-IS neighbors including the layer-2 gateway device if the module receives a notification sent by the layer-2 gateway device indicating functions of learning remote MAC addresses have been enabled in the layer-2 gateway device.

* * * * *